United States Patent Office 2,952,519
Patented Sept. 13, 1960

2,952,519

MANUFACTURE OF MANGANESE CARBONYLS

Harold E. Podall and Hymin Shapiro, Baton Rouge, La., assignors to Ethyl Corporation, New York, N.Y., a corporation of Delaware No Drawing. Filed Dec. 23, 1957, Ser. No. 704,283

4 Claims. (Cl. 23—203)

This invention is concerned with manganese carbonyls and a process for their manufacture.

Although the carbonyls of some metals such as iron and nickel are somewhat readily prepared, manganese carbonyls are difficult to produce by the known techniques. For example, it has been reported in the literature that manganese pentacarbonyl can be prepared by reacting manganese iodide with magnesium in diethyl ether under a high pressure of carbon monoxide. This procedure suffers particular disadvantages which prevent its employment in a commercial sense. In particular, the only manganese halide employable is manganese iodide prepared by the reaction of cuprous iodide with manganese metal. Likewise, as yet no substitute for diethyl ether has been found. A still further disadvantage of the process is that the yields are low and unaffected by increase in temperature and pressure.

Another procedure reported for the preparation of manganese pentacarbonyl, although such was not apparently produced in recoverable yield, is the reaction of an ether suspension of manganese iodide with a Grignard reagent under a pressure of carbon monoxide. This procedure has been improved somewhat by judicious choice of the Grignard reagents employed. However, even with these improvements the process suffers particular disadvantages which are to be overcome. For instance, for some unexplained reason the process is independent of variables such as pressure beyond a certain point. Essentially no change is obtained in the rate of reaction or in the yield when such variables are changed. A still further disadvantage of the process is that by-product metal is formed which cannot be converted to the desired carbonyl compound.

Accordingly, it is an object of this invention to provide a novel process for the manufacture of manganese carbonyls. Another object is to provide a process for the manufacture of manganese carbonyls in higher yield and purity than heretofore obtainable. These and other objects will be apparent as the discussion proceeds.

The objects of this invention are obtained by reacting a manganese salt, including the oxides and sulfides, with a stable organometallic compound of a group II–B metal of the periodic chart of the elements and carbon monoxide. While the benefits of this invention are generally realized when employing any of the group II–B metal organometallic compounds those of zinc are particularly preferred because of their greater reactivity and economy. Likewise the manganese halides, oxides, sulfides or salts of low molecular weight organic acids are preferred, the latter being especially preferred.

When employing the procedure of this invention, simultaneous reaction of the manganese salt, organometallic compound and carbon monoxide is obtained thus providing an enhancement in yield, faster reaction rates and minimization of undesirable by-product metals. Another advantage of the process of this invention is that a diverse number of manganese salts can be employed along with various diluents if desired. A still further advantage of the process is that the metal carbonyl is directly produced in the reaction, whereas in the past processes employing the Grignard reagents, at the completion of the reaction, as pointed out in the work by Hieber et al., Z. Anorg. Chem. 221, 321 (1935) it is necessary to quench with water to obtain the product. Other advantages of the process of this invention will be evident as the discussion proceeds.

The manganese salts employable are many and varied. For the purposes herein the oxides and sulfides of manganese are also intended in the terminology "salts" although such are not truly salts. The salts can be both inorganic and organic in nature. Typical examples of the inorganic salts include the halides, phosphates, sulfides, sulfates, nitrates, fluosilicates, carbonates, oxides and the like. The organic salts include, for example, the carboxylates, e.g., alkyl, aryl, cycloalkyl, and the like; the alcoholates, e.g., phenates, alkoxides, phenolates, and enolates, and the thioalcoholates or mercaptides. Among the inorganic salts employable in the process are manganese bromide, iodide, fluoride and chloride, manganese carbonate, the various manganese oxides, manganese phosphate, manganese fluosilicate, manganese sulfate, manganese sulfide, manganese sulfite, and the like. Among the organic salts of manganese employable in the process are included, for example, manganese acetate, manganese benzoate, manganese citrate, manganese formate, manganese lactate, manganese oxalate, manganese malonate, manganese valerate, manganese naphthenate, manganese oleate, manganese acetylacetonate, manganese toluate, manganese phenate, manganese ethylate, manganese decanoate, manganese thiomethylate, and the like. It is to be understood that all valence states of manganese are intended. For example, "manganese" is meant to denote both the manganic and manganous salts. For best results the manganese halides, oxides, sulfides and salts of alkanoic acids having from about 1 to 8 carbon atoms are especially preferred. The aforementioned manganese salts of alkanoic acids are especially preferred over the oxides, sulfides, and halides since higher yields are obtained with such salts. In those instances wherein the manganese salt is a solid in the reaction mixture it is generally desirable to employ such material in finely divided form of the order of about 1000 microns or less.

The organometallic compound employed in the process is one of an element of the group II–B elements of the periodic table. Such elements include zinc, cadmium and mercury. The organometallic compound will usually contain between about 1 to 25 carbon atoms in each organic radical. In general, the metal is attached to at least one carbon atom of an organic radical. It can additionally, however, be attached to other elements, as for example, the halides, hydrogen or another metal, particularly the group I–A metals. Typical examples of the group II–B organometallic compounds include the following: diisopropylzinc, diethylzinc, dimethylzinc, dibutylzinc, diamylzinc, dihexylzinc, dioctylzinc, methylethylzinc, ethyl-n-propyl zinc, isopropyl-n-butylzinc, n-heptyl-n-octyl zinc, ethyl zinc bromide, ethylzinc chloride, ethylzinc iodide, n-butylzinc bromide, ethylzinc hydride, n-butylzinc hydride, dicyclohexyl zinc, sodium zinc triethyl, diphenyl zinc, dibenzyl zinc, and the like compounds of cadmium and mercury, such as diethyl cadmium, diethyl mercury, ethyl cadmium chloride, ethyl mercury iodide, diphenyl cadmium, dibenzyl mercury, and the like.

For practical purposes and best results, the alkyl zinc compounds are preferably employed. These compounds are more stable, more readily available and are of higher reactivity. Generally, each alkyl group therein will contain from 1 up to and including about 8 carbon atoms.

In general, the process of this invention is readily per-formed by adding the manganese salt and the organometallic compound into a reaction vessel and pressurizing with carbon monoxide. If desired, the reaction can be conducted in the presence of an essentially inert liquid medium. The reaction mixture is usually agitated to provide adequate contact. In most instances the simultaneous reaction of these materials will take place at room temperature although heating is preferred to effect greater reaction rates. At the completion of the reaction the manganese carbonyl is recovered in a conventional manner such as distillation, sublimation, or separation of the by-product leaving the product in the liquid medium, when employed, which can then be recovered by concentration and filtration.

The process of this invention will be more fully understood by reference to the following examples. In all examples the parts and yields are by weight.

Example I

To a reactor equipped with external heating means, internal agitation, means for maintaining pressure, and means for admitting and discharging reactants, is added 1.7 parts of manganese acetate and a solution of 4.9 parts of diethyl zinc in 35 parts of diethyl ether under an inert atmosphere of nitrogen. The reactor is then pressurized to 3500 p.s.i.g. of carbon monoxide. Agitation is commenced and the temperature is raised to 100° C. These conditions are maintained for 6 hours. At the end of this period after cooling to room temperature the gases in the reactor are vented to the atmosphere and the reaction mixture quenched with water in dilute hydrochloric acid. The ether layer is separated and dried with "drierite." The dry ether layer is subjected to vacuum distillation at a temperature of 25 to 35° C. The concentrated liquor is then cooled in an ice bath and the solids filtered therefrom. In this manner yellow crystalline manganese pentacarbonyl dimer is recovered in high yield and purity.

Similer results are obtained when the above example is repeated employing 500 p.s.i.g. of carbon monoxide and a reaction time of 10 hours.

Example II

When Example I is repeated essentially as described with exception that 1.3 parts of manganese chloride are employed in place of the manganese acetate, manganese pentacarbonyl dimer is obtained in high yield.

Example III

A high yield of manganese pentacarbonyl dimer is obtained when Example I is repeated employing 40 parts of anisole in place of the diethyl ether and a temperature of 145° C. for 2 hours.

Example IV

When manganese sulfide or oxide is reacted with carbon monoxide and dimethyl zinc in isooctane according to the procedure of Example I but at 200° C., manganese pentacarbonyl dimer is obtained in high yield.

Example V

Manganese pentacarbonyl dimer is obtained when 1.3 parts of manganous formate are reacted with 5.2 parts of ethyl zinc chloride in benzene for 6 hours at 100° C. and 3500 p.s.i.g. of carbon monoxide.

Example VI

When Example I is repeated employing mesitylene in place of diethyl ether and diethyl cadmium in place of diethyl zinc at room temperature for 10 hours, manganese pentacarbonyl dimer is obtained.

Example VII

When 2½ parts of manganese acetylacetonate are reacted with 10 parts of dibenzy zinc in 30 parts of dry benzene at 165° C. and 3000 p.s.i.g. of carbon monoxide for 2 hours manganese pentacarbonyl dimer is obtained. Substituting diphenyl mercury for dibenzyl zinc in this run produces similar results.

Similar results are obtained when other manganese salts are employed in place of the manganese salts of the above examples, as for example, manganese carbonate, manganous naphthenate, manganous oleate, manganese propionate, manganese phenolate, manganese ethylate, and the like. Likewise for the zinc compounds employed in the above examples other group II–B organometallic compounds can be employed. For example, dimethylzinc, ethyl zinc bromide, ethyl zinc hydride, diphenyl zinc, sodium zinc triethyl and similar such compounds of cadmium and mercury may be substituted.

The temperature at which the reaction is conducted is, in general, not critical. Usually a temperature between about 0 to 200° C. is employed although the higher the temperature the faster the reaction rate. In order to enhance the reaction rate and to achieve best results it is preferred to operate at a temperature between about 75 to 175° C. Similarly, the pressure can be varied over a wide range from superatmospheric, as about 3000 atmospheres, to subatmospheric pressures. Ordinarily pressures above atmospheric are employed. A preferred range is between about 500 to 4000 p.s.i.g. in order to obtain optimum results. The time of reaction will depend somewhat upon the conditions under which the reaction is conducted although times up to about 20 hours are generally quite adequate. In order to minimize side effects it is preferred to conduct the reaction for a period of from 5 minutes to 6 hours.

The proportions of the reactants can likewise be varied and generally are biased on the metal salt. In this connection between about 0.65 mole to 15 moles and higher of the organometallic compound are employed per mole of the metal salt. Molar proportions of the order of 5 to 10 moles of the organometallic compound per mole of the manganese salt are preferred. However, as the temperature is increased the number of moles of the organometallic compound generally can be decreased. The carbon monoxide, being in gaseous form, is generally pressurized in the system in amounts sufficient to produce the manganese carbonyl. Large excesses can be employed without disadvantage since such excess is readily recovered and recycled for further use.

As demonstrated by the above examples, an organic diluent is usually employed although not required. Generally speaking such diluents should be essentially inert to the reactants. Among such organic diluents which can be employed are included the hydrocarbons, ethers and amines. Among the hydrocarbons included are for example nonanes, octadecanes, hexanes, toluene, benzene, xylene, mesitylene and mixed hydrocarbons such as gasoline, diesel oil and the like petroleum fractions. Among the ethers employable are included for example the nonaromatics, aromatics and polyethers including, for example, di-sec-butyl ether, di-n-heptyl ether, di-isopropyl ether, ethylisoamyl ether, methylphenylether (anisole), p-tolyl ether, ethylphenyl ether, tetraethylene glycol dimethyl ether, dioxane, tetrahydrofuran and the dimethyl, diethyl, and di-n-butyl ethers of diethylene glycol. Among the amines which are employable are included dimethyl amine, diethyl amine, dioctyl amine, diphenyl amine, dicyclohexyl amine, methylethyl amine, p-methyl pyridine, o-methyl pyridine, 2,6-dimethyl pyridine, isoquinoline, trimethyl amine, triethyl amine, tributyl amine, tricyclohexyl amine, and the like. The coordinating solvents, particularly the ethers, for example, anisole, are especially preferred since these materials exhibit a reaction promoting effect.

The process of this invention provides products which are of considerable use. A particularly advantageous use for the compounds produced is as additives to fuels for internal combustion engines and the like. For example, when sufficient manganous pentacarbonyl is added to commercial gasoline to obtain compositions containing one gram of manganese per gallon, the octane number of the gasoline is increased about 5 octane numbers. The products produced are also useful as chemical intermediates in preparing other organometallic compounds. These and other uses will be evident to those skilled in the art.

Having thus described the process of this invention it is not intended that it be limited except as set forth in the following claims.

We claim:

1. A process for the manufacture of manganese pentacarbonyl dimer which comprises reacting a manganese salt with a stable diorganometallic compound of a group II–B element and carbon monoxide at a temperature of 0–200° C., said carbon monoxide being employed at a pressure of 0–3000 atmospheres, said diorganometallic having the metal atom bonded directly to a carbon of each of the two organo groups.

2. The process of claim 1 wherein the organometallic compound is a compound of the element zinc.

3. A process for the manufacture of manganese pentacarbonyl dimer which comprises reacting manganese acetate with diethyl zinc and carbon monoxide at a temperature of from 0 to 200° C., said carbon monoxide being employed at a pressure of 0 to 3000 atmospheres.

4. The process of claim 1 wherein the diorganometallic compound is a dialkyl metal compound in which the alkyl groups contain from 1 to about 8 carbon atoms.

References Cited in the file of this patent

UNITED STATES PATENTS 2,822,247     Hnizda _____ Feb. 4, 1958

OTHER REFERENCES

Hurd et al.: Journal of American Chemical Society, vol. 71, pp. 1899, May 1949.

Karrer: "Organic Chemistry," Elsevier Publ. Co., Inc., New York, 1946, 2nd English ed., pages 145–146.